United States Patent
Chen et al.

(10) Patent No.: US 8,280,157 B2
(45) Date of Patent: Oct. 2, 2012

(54) METHODS AND SYSTEMS FOR REFINING TEXT DETECTION IN A DIGITAL IMAGE

(75) Inventors: Lawrence Shao-hsien Chen, Vancouver, WA (US); Jon M. Speigle, Vancouver, WA (US); Ahmet Mufit Ferman, Vancouver, WA (US); Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1189 days.

(21) Appl. No.: 11/679,357

(22) Filed: Feb. 27, 2007

(65) Prior Publication Data

US 2008/0205753 A1      Aug. 28, 2008

(51) Int. Cl.
    *G06K 9/00* (2006.01)
(52) U.S. Cl. ........ 382/165; 382/164; 382/176; 382/177; 358/462
(58) Field of Classification Search .................. 382/164, 382/165, 176, 177; 358/462
    See application file for complete search history.

(56) References Cited

U.S. PATENT DOCUMENTS

| 5,845,010 | A | 12/1998 | Silverbrook et al. |
| 6,778,700 | B2 | 8/2004 | Karidi et al. |
| 7,043,080 | B1 | 5/2006 | Dolan |
| 7,085,420 | B2 | 8/2006 | Mehrotra |
| 2002/0097417 | A1* | 7/2002 | Chang et al. ................. 358/1.13 |
| 2003/0133612 | A1* | 7/2003 | Fan ............................. 382/199 |
| 2005/0078853 | A1* | 4/2005 | Buehler et al. ............... 382/103 |
| 2005/0180660 | A1 | 8/2005 | Hu et al. |
| 2005/0226538 | A1* | 10/2005 | Di Federico et al. ......... 382/299 |
| 2005/0271284 | A1 | 12/2005 | Chen et al. |

FOREIGN PATENT DOCUMENTS

| JP | 2000-182053 A | 6/2000 |
| JP | 2004-48814 A | 2/2004 |
| JP | 2004-214908 A | 7/2004 |
| JP | 2006-229817 | * 8/2006 |

OTHER PUBLICATIONS

Japanese Patent Application No. 2008-045119—Office action—Mailing date Oct. 6, 2009.

* cited by examiner

*Primary Examiner* — Chan S Park
*Assistant Examiner* — Eueng-Nan Yeh
(74) *Attorney, Agent, or Firm* — Kristine Elizabeth Matthews; David C. Ripma

(57) ABSTRACT

Embodiments of the present invention comprise systems and methods for refining text-detection results for a digital image.

22 Claims, 11 Drawing Sheets

METHODS AND SYSTEMS FOR REFINING TEXT DETECTION IN A DIGITAL IMAGE

FIELD OF THE INVENTION

Embodiments of the present invention comprise methods and systems for refining text-detection results in a digital image.

BACKGROUND

Many digital image processing enhancements that improve the visual quality of a digital image may rely on the accurate identification of different image regions in the digital image. Additionally, accurate detection of various regions in an image may be critical in many compression processes.

SUMMARY

Some embodiments of the present invention comprise methods and systems for refining text-detection results in a digital image according to estimates of the background color and the text color in the image.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a drawing showing embodiments of the present invention comprising text map modification based on color estimates of text and background;

FIG. 2. is a drawing showing embodiments of the present invention comprising color estimation;

DETAILED DESCRIPTION OF EXEMPLARY EMBODIMENTS

Figure 1:
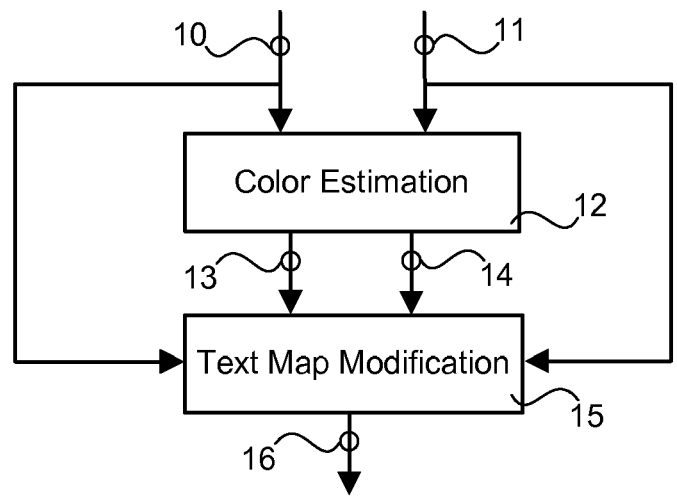

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

The content of a digital image can have considerable impact on the compression of the digital image, both in terms of compression efficiency and compression artifacts. Pictorial regions in an image are not efficiently compressed using compression algorithms designed for the compression of text. Similarly, text images are not efficiently compressed using compression algorithms that are designed and optimized for pictorial content. Not only is compression efficiency affected when a compression algorithm designed for one type of image content is used on a different type of image content, but the decoded image may exhibit visible compression artifacts.

Additionally, image enhancement algorithms designed to sharpen text, if applied to pictorial image content, may produce visually annoying artifacts in some areas of the pictorial content. In particular, pictorial regions containing strong edges may be affected. While smoothing operations may enhance a natural image, the smoothing of text regions is seldom desirable.

Copiers and scanners may use text segmentation to perform content-specific processing and efficient compression on document images. Exemplary content-specific processing may comprise differential filtering and color enhancement. Exemplary content-specific compression may comprise layered compression schemes, where the contents of a document image are segmented into a high-resolution foreground layer and a lower resolution background.

Reliable and efficient detection of text in digital images may be advantageous so that content-type-specific image enhancement methods may be applied to the appropriate regions in a digital image. The detection of regions of a particular content type in a digital image may improve compression efficiency, reduce compression artifacts, and improve image quality when used in conjunction with a compression algorithm or image enhancement algorithm designed for the particular type of content.

The semantic labeling of image regions based on content may also be useful in document management systems and image databases.

Text segmentation algorithms may identify the majority of text content in an image, but false positives and missed text may still remain. False positives may occur when areas surrounding text characters are erroneously marked as text, or when non-text regions in the image have text-like characteristics (e.g., strong edges). Misses may occur for thin strokes in small characters, for low-contrast text, or at the interiors of large characters. The effects of misses and false positives in the text segmentation map may be intensified after aggressive content-specific enhancement. Similarly, for the layered compression application, missed text pixels may cause parts of a single character to be assigned to different layers, thereby causing visible transition artifacts.

Embodiments of the present invention may comprise post-processing methods and systems that may refine text detection results for an image using the input image and a corresponding text segmentation map. Embodiments of the present invention may be used in combination with any text segmentation application. Embodiments of the present invention may use color estimates of text and non-text objects, referred to as background, in a document image to reduce misses and false positives in a text map. Color may comprise a color representation in any color space including, but not limited to, RGB, sRGB, CMYK, YUV, YIQ, YCbCr, YPbPr, HSV, HSL, Lab and L*a*b*.

Some embodiments of the present invention may be described in relation to FIG. 1. In these embodiments, an image 10 and a text map 11 may be used to determine 12 background and text color values. The text map 11 may comprise candidate text pixels corresponding to pixels in the image 10.

In some embodiments, the text map 11 may comprise a binary map with the same resolution as the image 10 wherein the text-map value for a pixel may be a first binary value if the corresponding pixel in the image 10 is a candidate text pixel and a second binary value if the corresponding pixel in the image 10 is not a candidate text pixel. In alternative embodiments, the text map 11 and the image 10 may be of different resolutions, and the pixel correspondence between the text map 11 and the image 10 may be determined by a mapping function, for example, a nearest-pixel mapping.

In some embodiments, the text map 11 may comprise a map with the same resolution as the image 10 wherein the text-map value for a pixel may be a first value if the corresponding pixel in the image 10 is a candidate text pixel and any of a plurality of other values if the corresponding pixel in the image 10 is not a candidate text pixel. In some embodiments, each particular value in the plurality of other values may represent additional image-feature classifications. In alternative embodiments, the text map 11 and the image 10 may be of different resolutions, and the pixel correspondence between the text map 11 and the image 10 may be determined by a mapping function, for example, a nearest-pixel mapping.

In some embodiments, the text map 11 may comprise a map with the same resolution as the image 10 wherein the text-map value for a pixel may reflect a membership confidence that the corresponding pixel in the image 10 is a candidate text pixel. In alternative embodiments, the text map 11 and the image 10 may be of different resolutions, and the pixel correspondence between the text map 11 and the image 10 may be determined by a mapping function, for example, a nearest-pixel mapping.

It is understood that there are many data structures and representations by which the text map may be stored and manipulated. For the purposes of illustration and example, throughout this specification, the text map may be considered an array. This is by way of illustration and not limitation.

In some embodiments of the present invention, background-color estimates 13 and text-color estimates 14 may be used with the image 10 and the text map 11 to modify 15 the text map 11, and may thereby produce a refined text map 16.

Figure 2:
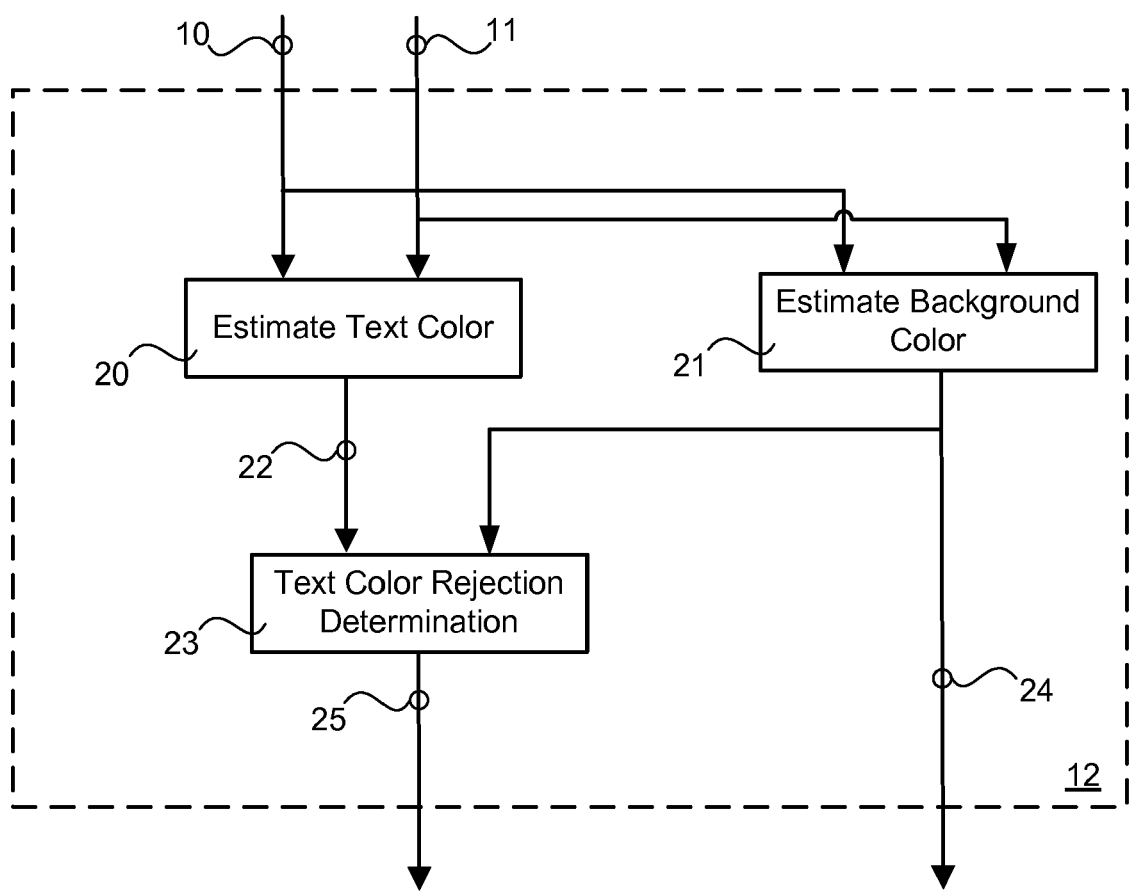

In some embodiments of the present invention, color estimation 12 may be described in relation to FIG. 2. Color estimation 12 may comprise forming a text-color estimate 20 and forming a background-color estimate 21. In some embodiments of the present invention, a text-color may be estimated 20 for each pixel location in the image 10. In alternative embodiments, the text-color may be estimated 20 on a region-by-region basis in the image 10. For example, a text-color estimate may be formed 20 corresponding to a block of pixels in the image 10. In some embodiments of the present invention, a background-color estimate may be formed 21 for each pixel location in the image 10. In alternative embodiments, a background-color estimate may be formed 20 on a region-by-region basis in the image 10. For example a background-color estimate may be formed 20 corresponding to a block of pixels in the image 10. In an exemplary embodiment, using a block-based method on a 300 dpi (dots per inch) image data 10 and text map 11 and a 4×4 block size, a color estimate may be at 75 dpi and may reduce memory and computation requirements.

Color estimation, either text 20 or background 21, may comprise computing summary colors. In some embodiments, computing 20 a text-color estimate at a pixel location may comprise summarizing the color values of text pixels in a region, or window, surrounding the pixel location, where text pixels may be identified using the text map 11. In alternative embodiments, computing 20 a text-color estimate for a block may comprise summarizing the color values of text pixels in the block, where text pixels may be identified using the text map 11. In some embodiments, computing 21 a background-color estimate at a pixel location may comprise summarizing the color values of non-text pixels in a region surrounding the pixel location, where non-text pixels may be identified using the text map 11. In alternative embodiments, computing 21 a background-color estimate for a block may comprise summarizing the color values of non-text pixels in the block, where non-text pixels may be identified using the text map 11. Exemplary methods for summarizing the color values of a plurality of pixels may comprise averaging, median filtering, trimmed-mean filtering, weighted averaging, and other methods known in the art.

In some embodiments of the present invention, if a window or block does not contain any text pixels according to the text map 11, then the text-color estimate for the pixel or block may be identified as invalid. In some embodiments, all text-color estimates may be initialized to an invalid state. In some embodiments, a color value may be reserved to indicate the invalid state. In alternative embodiments, a separate data structure may be maintained to indicate the position of valid estimates.

In alternative embodiments of the present invention, if a window or block does not contain any text pixels according to the text map 11, then the text-color estimate for the pixel or block may be based on surrounding estimates.

Figure 3:
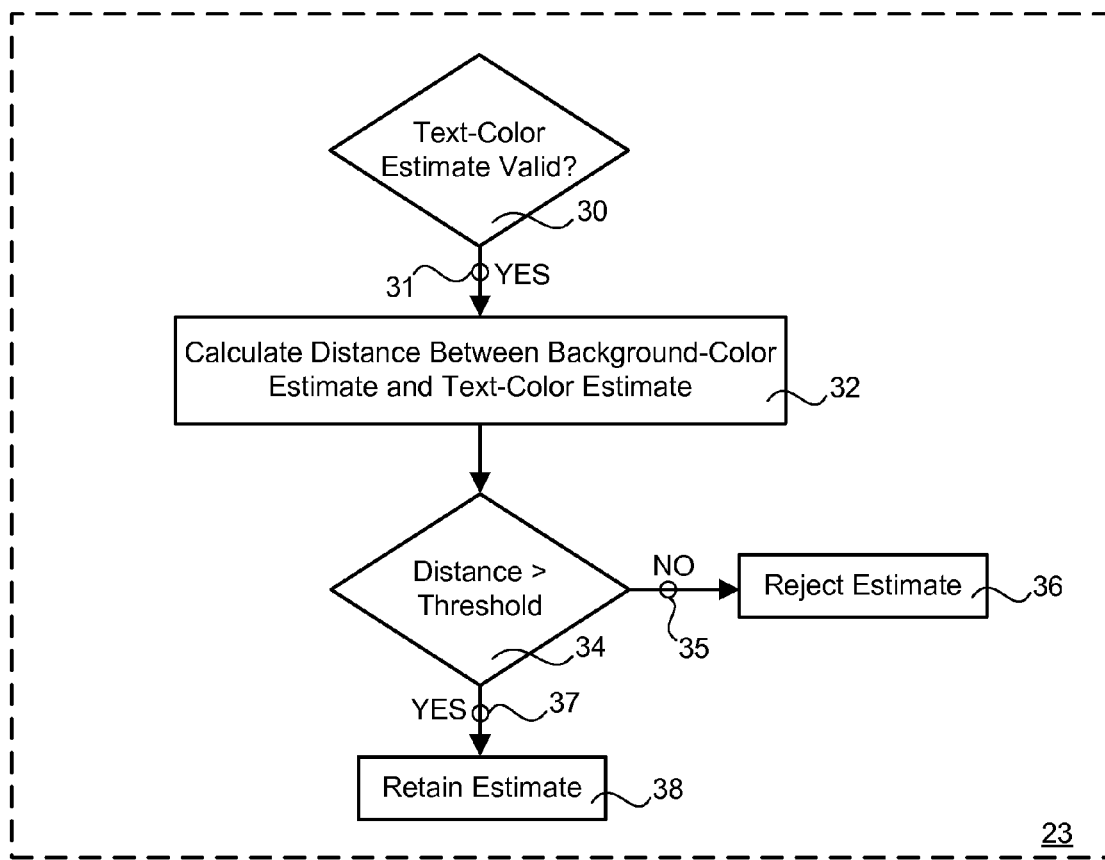
FIG. 3 is a drawing showing embodiments of the present invention comprising rejection of text color estimates based on the distance between a text-color estimate and a background-color estimate.

In some embodiments of the present invention, a text-color rejection process 23 may evaluate the initial text-color estimates 22 and background-color estimates 24 for consistency. Text-color rejection determination may be performed according to FIG. 3 in some embodiments of the present invention. In these embodiments, a text-color estimate may be examined to determine if it is a valid estimate 30. If the text-color estimate is valid 31, then the text-color estimate may be compared to the corresponding background-color estimate. The distance between the background-color estimate the text-color estimate may be calculated 32. In some embodiments, text and background colors may be compared in terms of the distance, d, between them using a Euclidean distance metric on the color values (for example, CIE ΔE on Lab image data) or any other distance measure. The distances may be compared to a threshold 34. A text-color estimate may be retained

38, if the text color estimate is valid and the distance, d, exceeds a predetermined threshold 37. Otherwise 35, the estimate may be rejected 36. In some embodiments, rejecting a text-color estimate may comprise converting the estimate to the invalid state. This operation may eliminate text-color estimates at positions where the text-color estimate is too similar to the background color. In some embodiments, the text-color estimate may be down-sampled after linearly or robustly filtering the estimates to obtain a final, lower resolution text color estimate.

Figure 4:
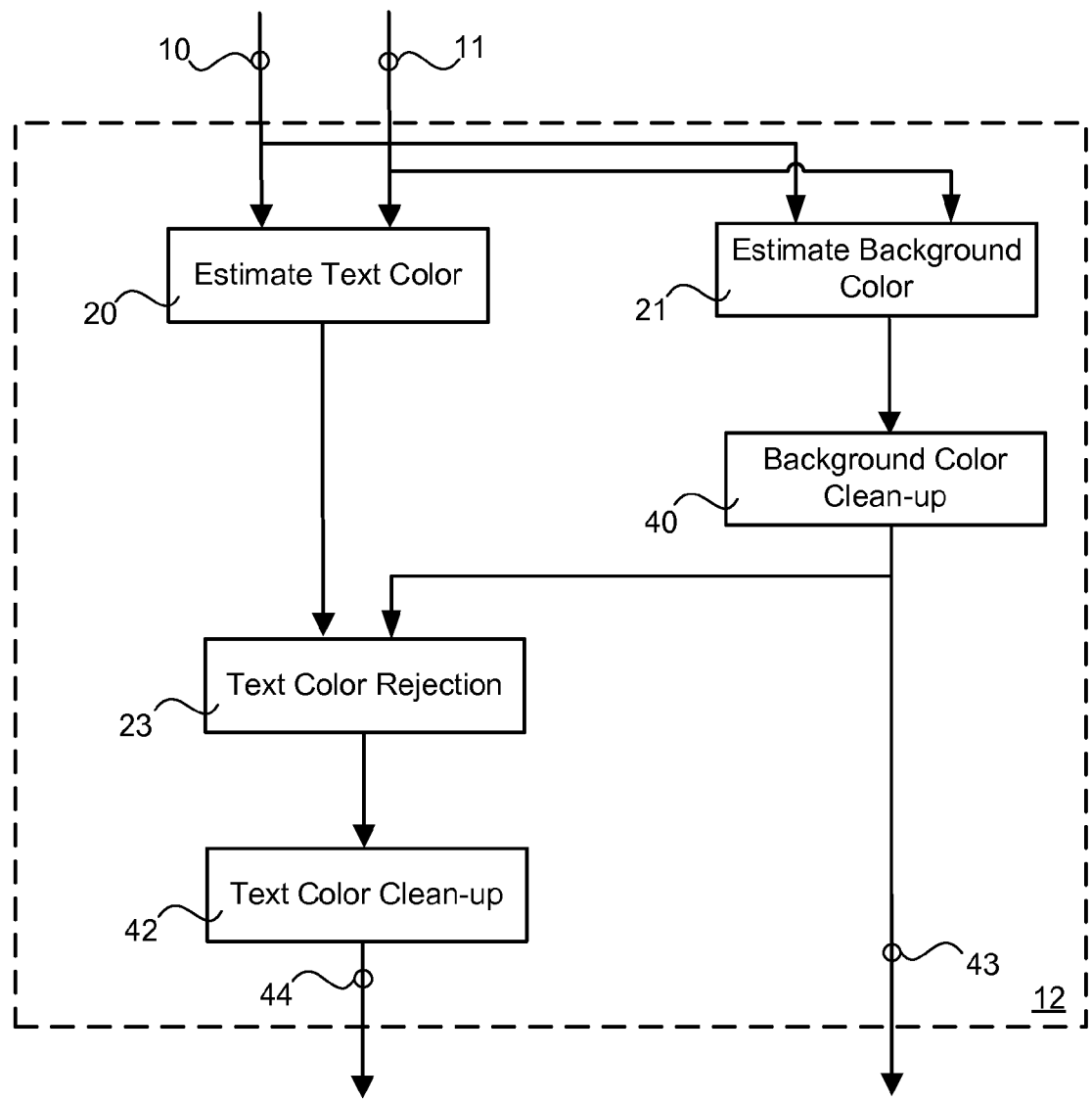
FIG. 4 is a drawing showing embodiments of the present invention comprising color estimation with clean-up of text-color estimates and background-color estimates.

Some embodiments of the present invention may be described in relation to FIG. 4. Color estimation 12 may comprise forming a text-color estimate 20 and forming a background-color estimate 21. After estimating the background color, a background color clean-up process 40 may be performed. Similarly after text-color rejection determination, a text-color clean-up process 42 may be performed. The resulting text-color estimates 44 and background-color estimates 43 may be used in text map modification 15. Exemplary clean-up processes comprise sub-sampling and robust sub-sampling methods.

After color estimation 12 is performed according to any of the embodiments described above, text-map modification 15 may be performed.

Figure 5:
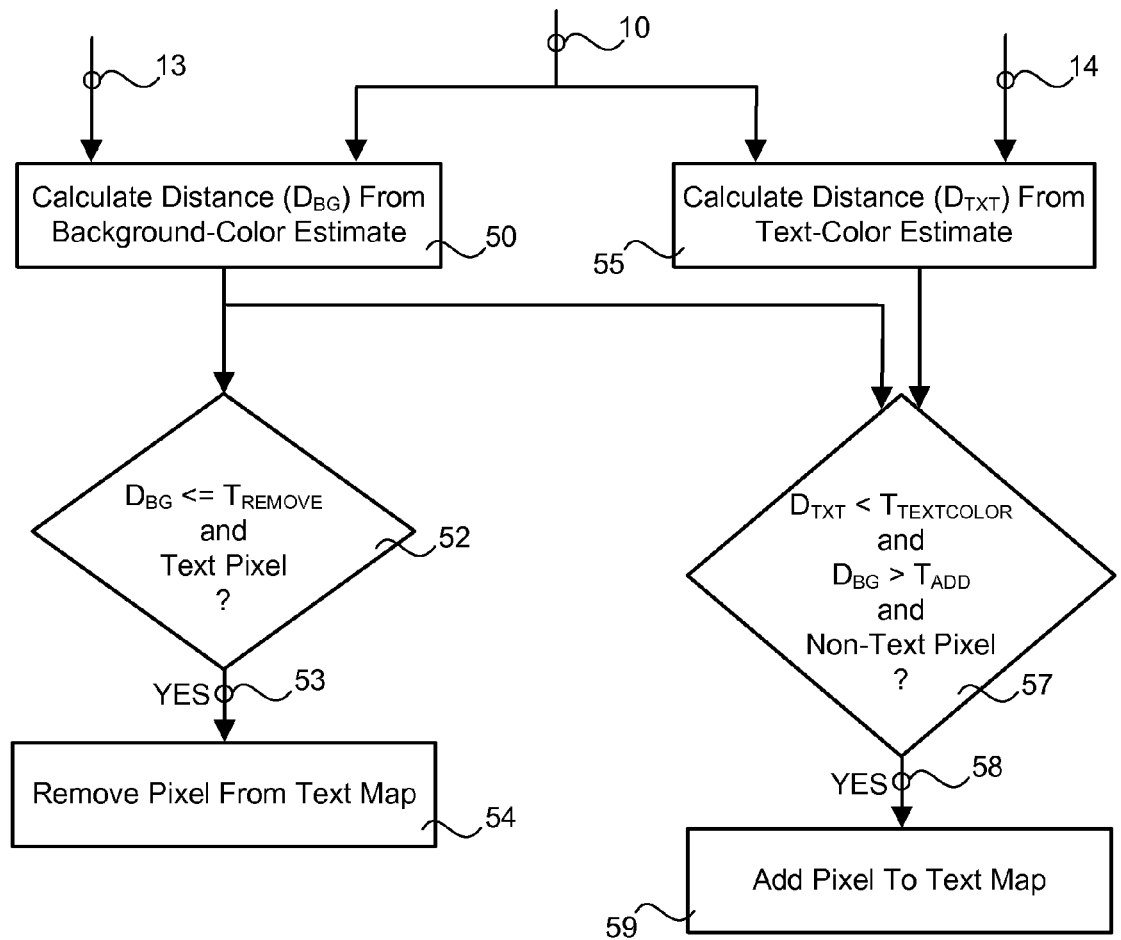
FIG. 5 is a drawing showing embodiments of the present invention comprising text map modification based on thresholding conditions.

Some embodiments of the present invention may be described in relation to FIG. 5. In these embodiments, at each pixel location in the text map, a difference between the corresponding background-color estimate 13 and the corresponding pixel in the image 10 may be calculated 50, and a difference between the corresponding text-color estimate 14 and the corresponding pixel in the image 10 may be calculated 55. In some embodiments of the present invention, the difference between two color values may comprise a distance measure between the two color values. A distance may be calculated according to any distance measure. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

The distance between the background-color estimate and the image value at corresponding pixel locations may be compared to a removal threshold 52 in order to remove a false positive in the text map. If the distance between the background-color estimate and the image value at corresponding pixel locations is less than the removal threshold 53, then a pixel in the text map that is identified as a text pixel may be reclassified as a non-text pixel 54.

The distance between the text-color estimate and the image value at corresponding pixel locations may be compared to a text-color threshold, and the distance between the background-color estimate and the image value at corresponding pixel locations may be compared to an addition threshold 57 in order to add missed pixels into the text map. If the distance between the text-color estimate and the image value at corresponding pixel locations is less than the text-color threshold and the distance between the background-color estimate and the image value at corresponding pixel locations is greater than the addition threshold 58, then a pixel in the text map that is identified as a non-text pixel may be reclassified as a text pixel 59.

Figure 6:
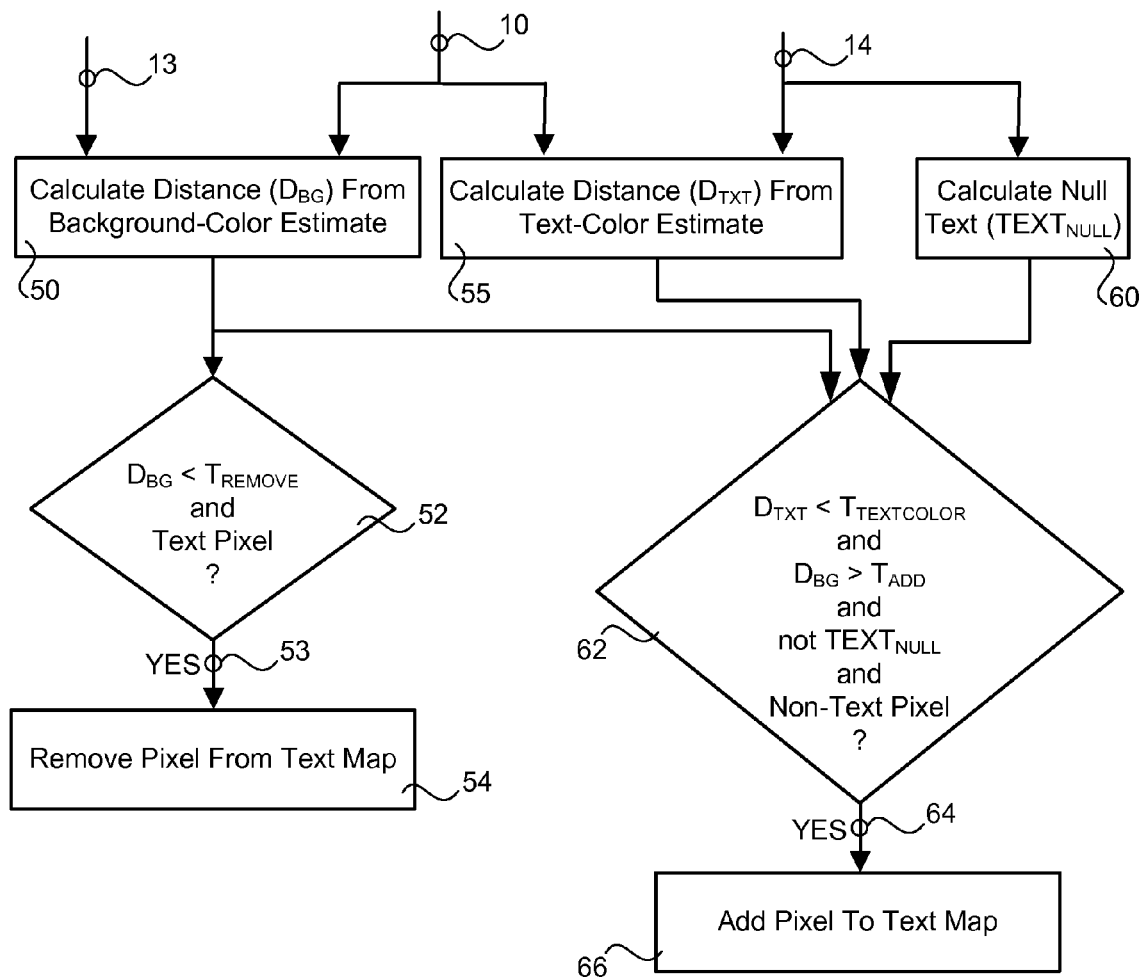
FIG. 6 is a drawing showing embodiments of the present invention comprising text map modification based on thresholding conditions and validity of text-color estimates.

In some embodiments of the present invention, the decision to add a pixel to the text map may be based on the validity of the text-color estimate. These embodiments may be described in relation to FIG. 6. In these embodiments, at each pixel location in the text map, a difference between the corresponding background-color estimate 13 and the corresponding pixel in the image 10 may be calculated 50, and a difference between the corresponding text-color estimate 14 and the corresponding pixel in the image 10 may be calculated 55. The validity of the text-color estimate 14 may be determined 60. In some embodiments of the present invention, the difference between two color values may comprise a distance measure between the two color values. A distance may be calculated according to any distance measure. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

The distance between the background-color estimate and the image value at corresponding pixel locations may be compared to a removal threshold 52 in order to remove a false positive in the text map. If the distance between the background-color estimate and the image value at corresponding pixel locations is less than the removal threshold 53, then a pixel in the text map that is identified as a text pixel may be reclassified as a non-text pixel 54.

The distance between the text-color estimate and the image value at corresponding pixel locations may be compared to a text-color threshold, and the distance between the background-color estimate, the image value at corresponding pixel locations may be compared to an addition threshold and the text-color estimate validity may be considered 62 in determining whether to add a pixel into the text map. If the distance between the text-color estimate and the image value at corresponding pixel locations is less than the text-color threshold and the distance between the background-color estimate and the image value at corresponding pixel locations is greater than the addition threshold and the text-color estimate is valid 64, then a pixel in the text map that is identified as a non-text pixel may be reclassified as a text pixel 66.

Figure 7:
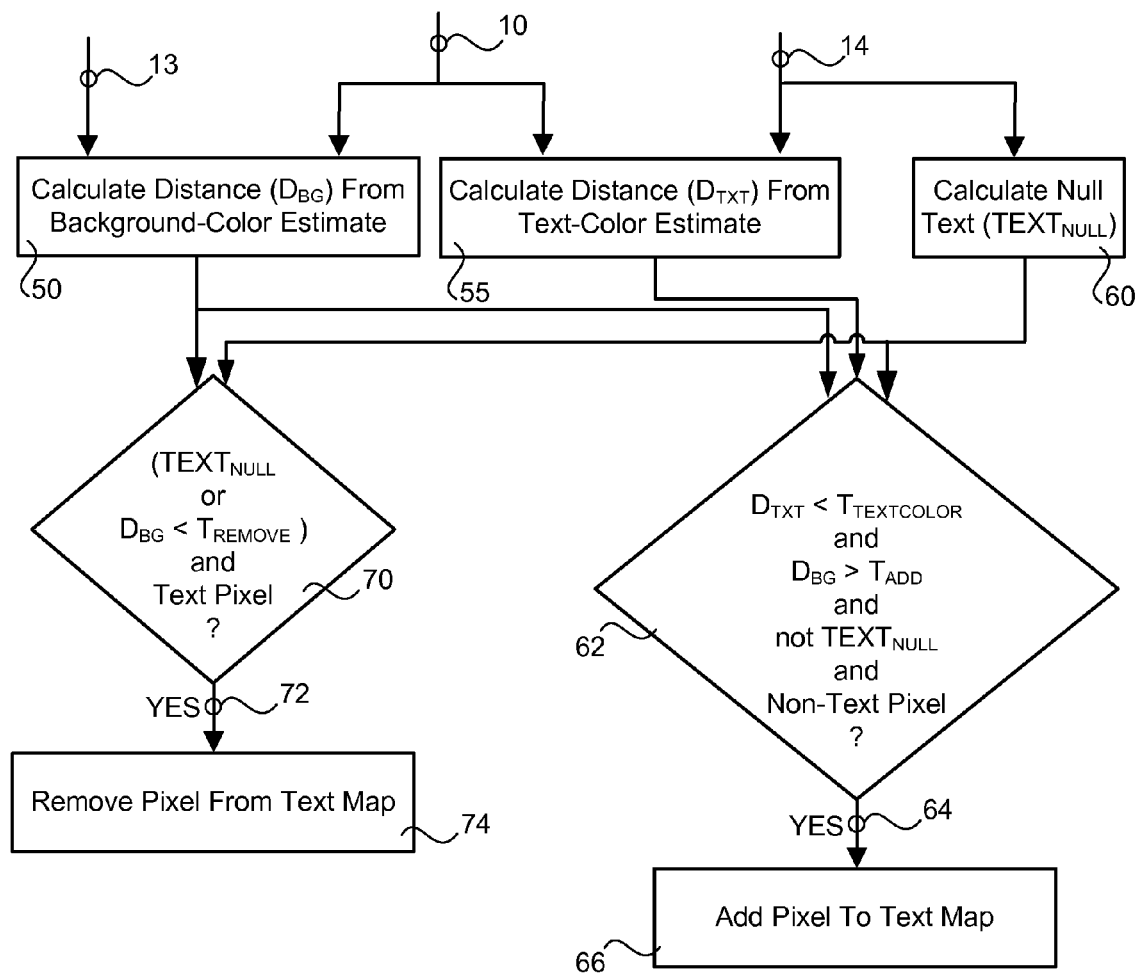
FIG. 7 is a drawing showing embodiments of the present invention comprising text map modification based on thresholding conditions and validity of text-color estimates.

In some embodiments of the present invention, the decision to remove a pixel from the text map may be based on the validity of the text-color estimate. These embodiments may be described in relation to FIG. 7. In these embodiments, at each pixel location in the text map, a difference between the corresponding background-color estimate 13 and the corresponding pixel in the image 10 may be calculated 50, and a difference between the corresponding text-color estimate 14 and the corresponding pixel in the image 10 may be calculated 55. The validity of the text-color estimate 14 may be determined 60. In some embodiments of the present invention, the difference between two color values may comprise a distance measure between the two color values. A distance may be calculated according to any distance measure. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

The distance between the background-color estimate and the image value at corresponding pixel locations may be compared to a removal threshold and the validity of the text-color estimate may be examined in order to remove a false positive in the text map. If the distance between the background-color estimate and the image value at corresponding pixel locations is less than the removal threshold or the text-color estimate is invalid 72, then a pixel in the text map that is identified as a text pixel may be reclassified as a non-text pixel 74.

The distance between the text-color estimate and the image value at corresponding pixel locations may be compared to a text-color threshold, and the distance between the background-color estimate, the image value at corresponding pixel locations may be compared to an addition threshold and the text-color estimate validity may be considered 62 in determining whether to add a pixel into the text map. If the distance between the text-color estimate and the image value at corresponding pixel locations is less than the text-color threshold and the distance between the background-color estimate and the image value at corresponding pixel locations is greater than the addition threshold and the text-color estimate is valid 64, then a pixel in the text map that is identified as a non-text pixel may be reclassified as a text pixel 66.

Figure 9:
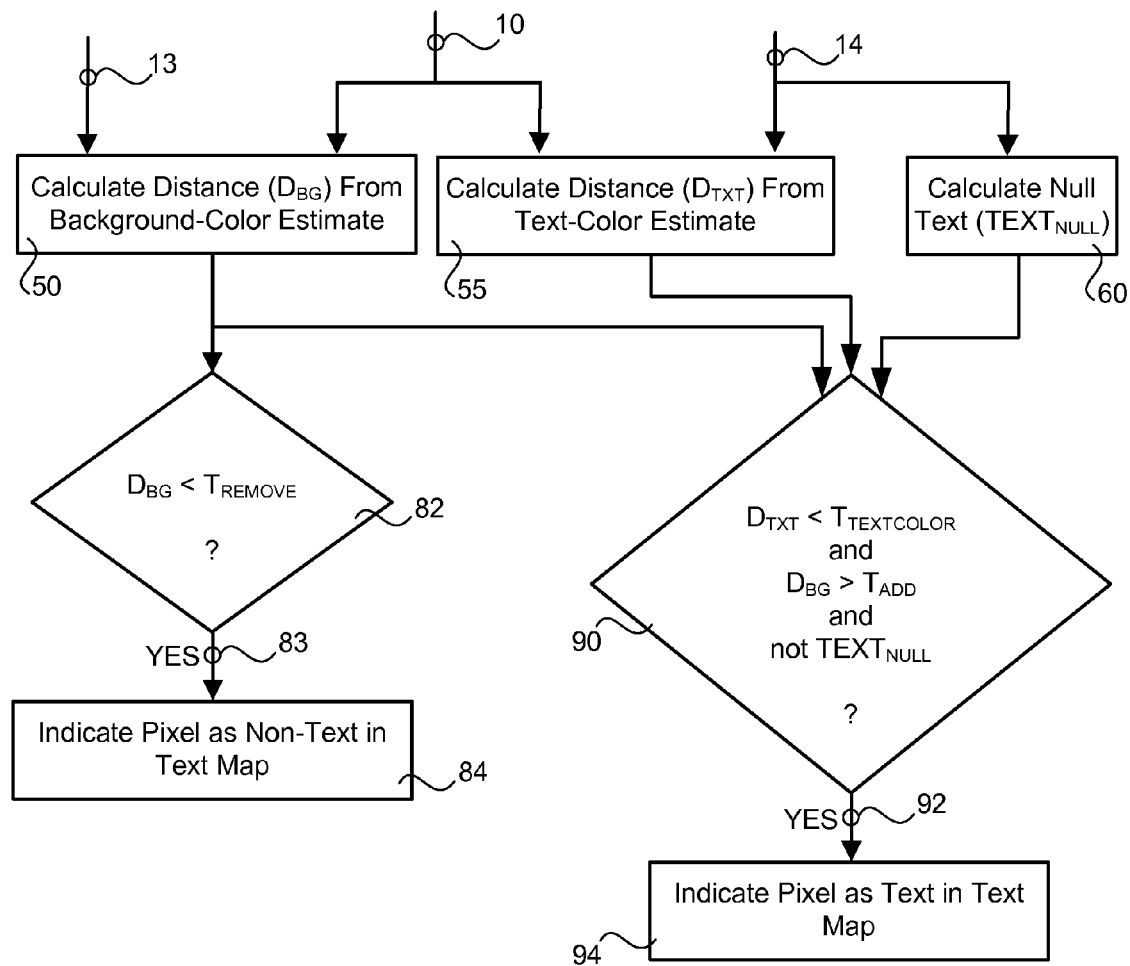
FIG. 9 is a drawing showing embodiments of the present invention comprising text map modification based on thresholding conditions and validity of text-color estimates.
Figure 10:
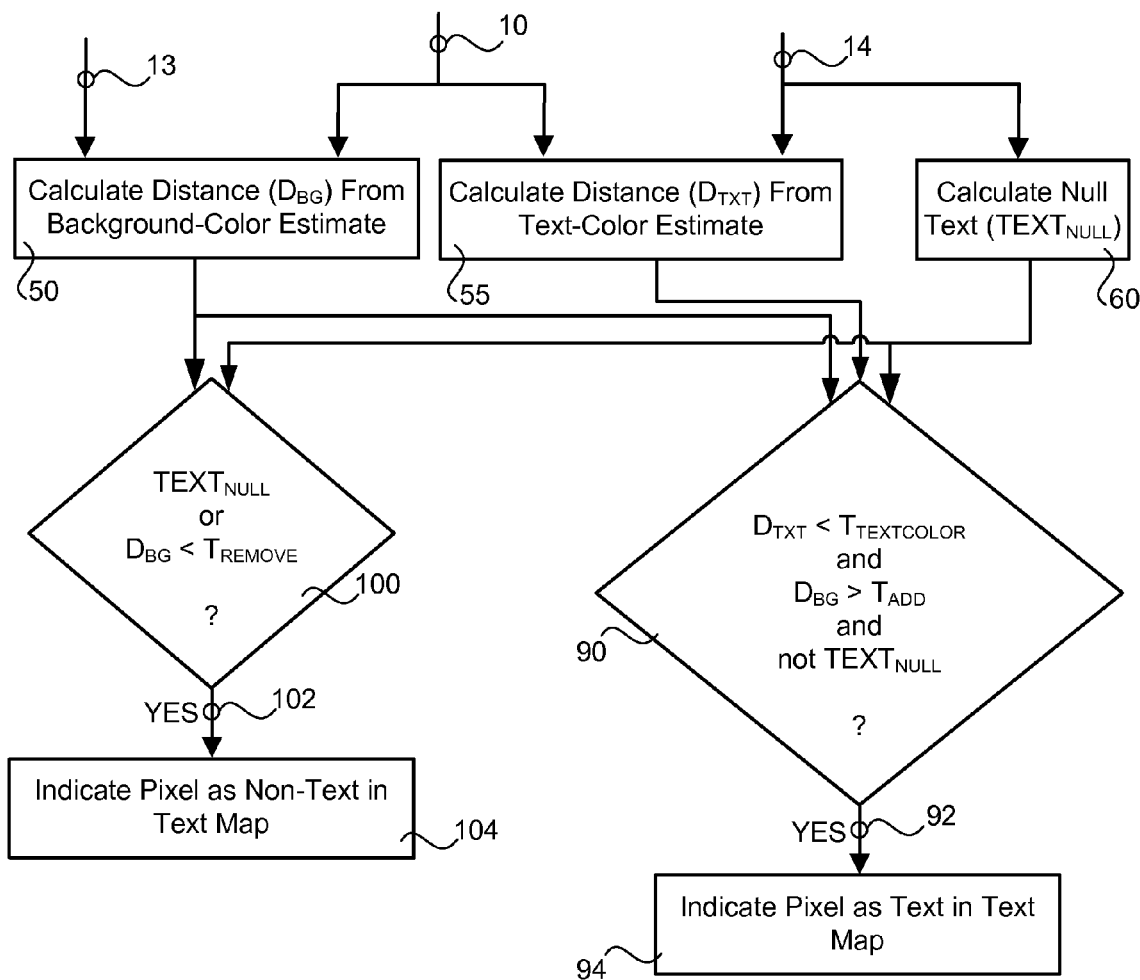
FIG. 10 is a drawing showing embodiments of the present invention comprising text map modification based on thresholding conditions and validity of text-color estimates.

In alternative embodiments of the present invention, a text map may be updated without explicitly checking the current text state of a pixel. In these embodiments, the state of the pixel in the text map may be determined according to the conditions of the above described embodiments and set irrespective of the current text state. Some of these alternative embodiments may be described in relation to FIGS. 8-10.

Figure 8:
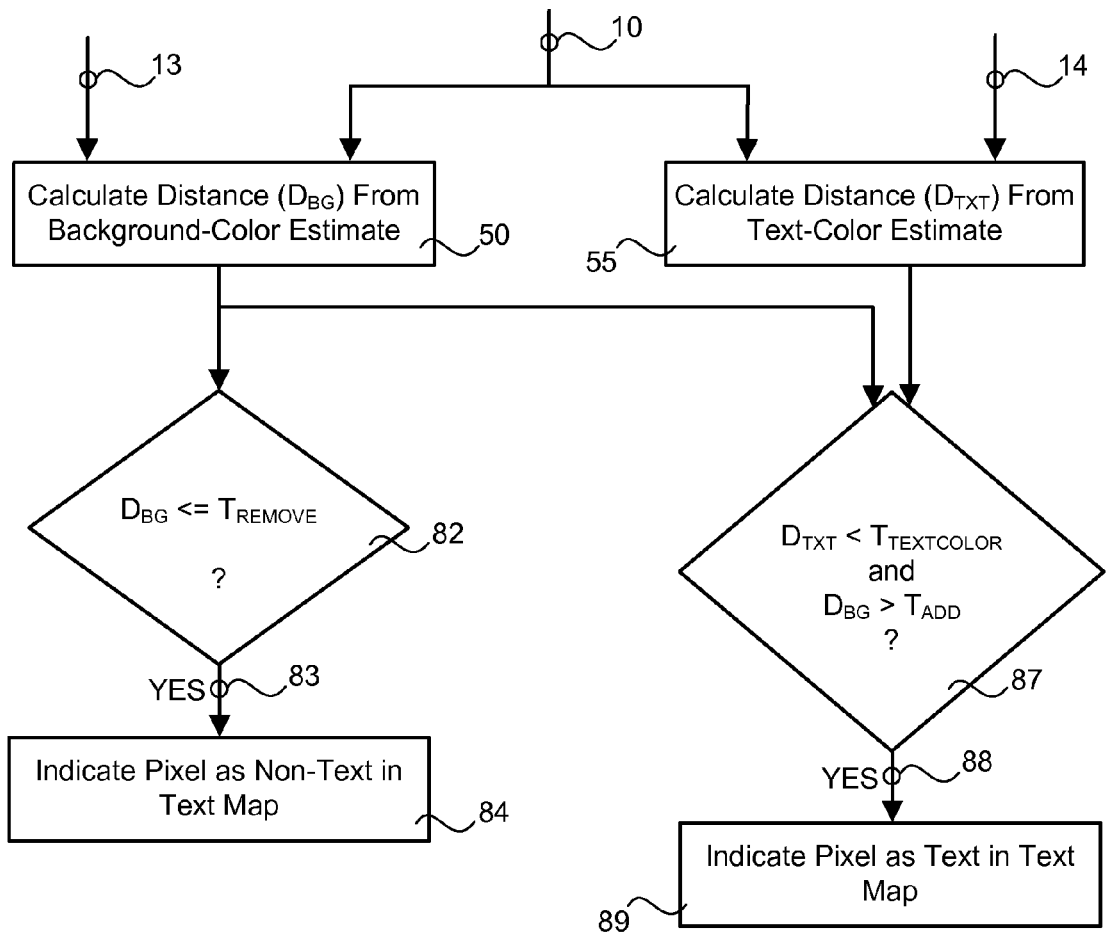
FIG. 8 is a drawing showing embodiments of the present invention comprising text map modification based on thresholding conditions.

Some embodiments of the present invention may be described in relation to FIG. 8. In these embodiments, at each pixel location in the text map, a difference between the corresponding background-color estimate 13 and the corresponding pixel in the image 10 may be calculated 50, and a difference between the corresponding text-color estimate 14 and the corresponding pixel in the image 10 may be calculated 55. In some embodiments of the present invention, the difference between two color values may comprise a distance measure between the two color values. A distance may be calculated according to any distance measure. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

The distance between the background-color estimate and the image value at corresponding pixel locations may be compared to a removal threshold 82. If the distance between the background-color estimate and the image value at corresponding pixel locations is less than the removal threshold 83, then the pixel value in the text map may be set to indicate that the pixel is a non-text pixel 84.

The distance between the text-color estimate and the image value at corresponding pixel locations may be compared to a text-color threshold, and the distance between the background-color estimate and the image value at corresponding pixel locations may be compared to an addition threshold 87. If the distance between the text-color estimate and the image value at corresponding pixel locations is less than the text-color threshold and the distance between the background-color estimate and the image value at corresponding pixel locations is greater than the addition threshold 88, then the pixel value in the text map may be set to indicate that the pixel is a text pixel 89.

In some embodiments of the present invention, the decision to add a pixel to the text map may be based on the validity of the text-color estimate. These embodiments may be described in relation to FIG. 9. In these embodiments, at each pixel location in the text map, a difference between the corresponding background-color estimate 13 and the corresponding pixel in the image 10 may be calculated 50, and a difference between the corresponding text-color estimate 14 and the corresponding pixel in the image 10 may be calculated 55. The validity of the text-color estimate 14 may be determined 60. In some embodiments of the present invention, the difference between two color values may comprise a distance measure between the two color values. A distance may be calculated according to any distance measure. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

The distance between the background-color estimate and the image value at corresponding pixel locations may be compared to a removal threshold 82. If the distance between the background-color estimate and the image value at corresponding pixel locations is less than the removal threshold 83, then the pixel value in the text map may be set to indicate that the pixel is a non-text pixel 84.

The distance between the text-color estimate and the image value at corresponding pixel locations may be compared to a text-color threshold, and the distance between the background-color estimate, the image value at corresponding pixel locations may be compared to an addition threshold and the text-color estimate validity may be considered 90 in determining whether to add a pixel into the text map. If the distance between the text-color estimate and the image value at corresponding pixel locations is less than the text-color threshold and the distance between the background-color estimate and the image value at corresponding pixel locations is greater than the addition threshold and the text-color estimate is valid 92, then the pixel value in the text map may be set to indicate that the pixel is a text pixel 94.

In some embodiments of the present invention, the decision to label a pixel in the text map as a non-text pixel may be based on the validity of the text-color estimate. These embodiments may be described in relation to FIG. 10. In these embodiments, at each pixel location in the text map, a difference between the corresponding background-color estimate 13 and the corresponding pixel in the image 10 may be calculated 50, and a difference between the corresponding text-color estimate 14 and the corresponding pixel in the image 10 may be calculated 55. The validity of the text-color estimate 14 may be determined 60. In some embodiments of the present invention, the difference between two color values may comprise a distance measure between the two color values. A distance may be calculated according to any distance measure. Exemplary distance measures may comprise a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation and other well-known-in-the-art distance measures.

The distance between the background-color estimate and the image value at corresponding pixel locations may be compared to a removal threshold and the validity of the text-color estimate may be examined 100. If the distance between the background-color estimate and the image value at corresponding pixel locations is less than the removal threshold or the text-color estimate is invalid 102, then the pixel in the text map may be identified as a non-text pixel 104.

The distance between the text-color estimate and the image value at corresponding pixel locations may be compared to a text-color threshold, and the distance between the background-color estimate, the image value at corresponding pixel locations may be compared to an addition threshold and the text-color estimate validity may be considered 90 in determining whether to add a pixel into the text map. If the distance between the text-color estimate and the image value at corresponding pixel locations is less than the text-color threshold and the distance between the background-color estimate and the image value at corresponding pixel locations is greater than the addition threshold and the text-color estimate is valid 92, then the pixel in the text map may be identified as a text pixel 94.

Figure 11:
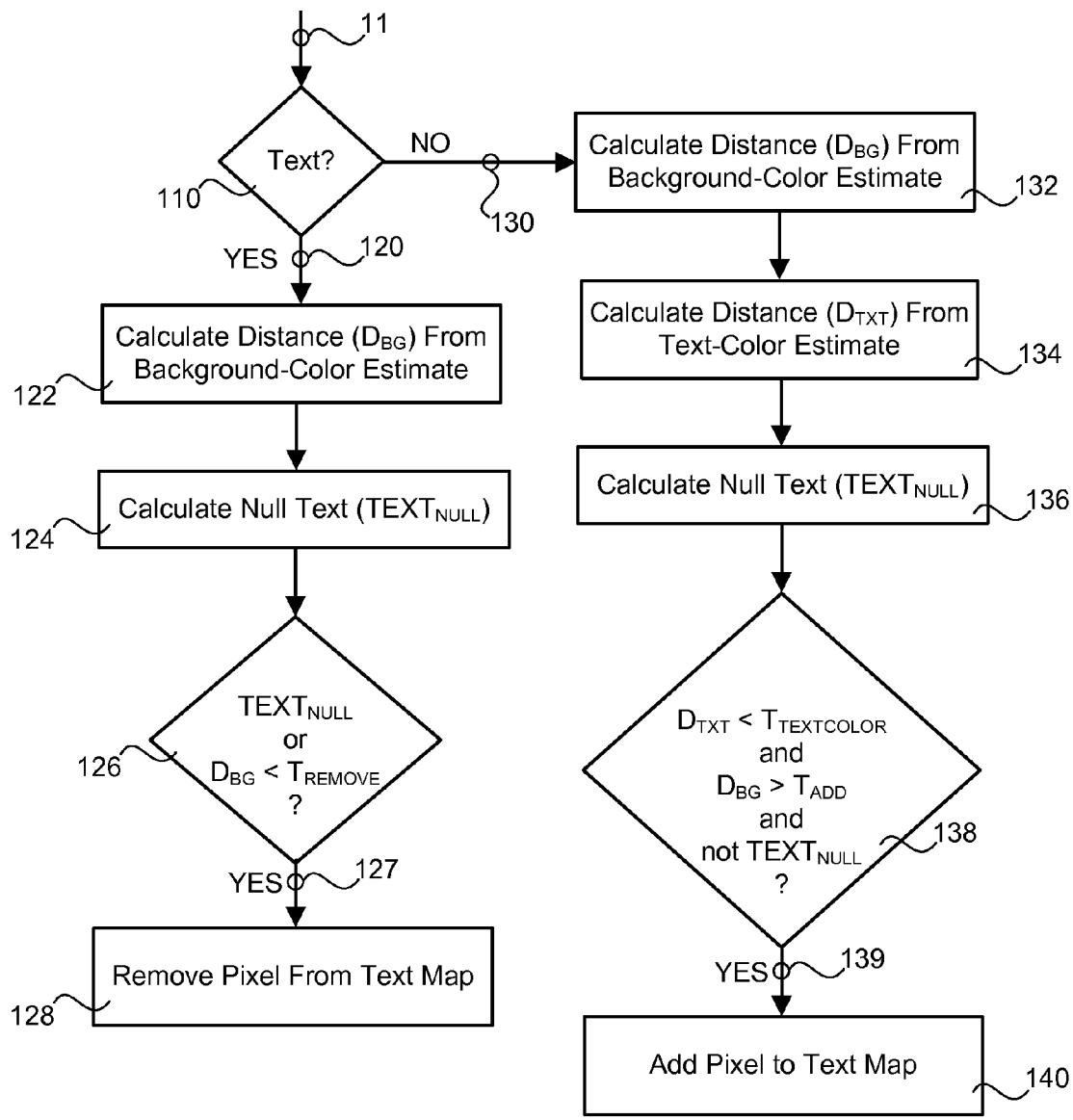
FIG. 11 is a drawing showing embodiments of the present invention comprising text map modification.

Some embodiments of the present invention may be described in relation to FIG. 11. In these embodiments, the text map 11 may be examined 110 to determine if a pixel has been classified as a text pixel. If the pixel is a non-text pixel 130 according to the text map 11, then the distance between the background-color estimate and the image value at corresponding pixel locations may be calculated 132. The distance between the text-color estimate and the image value at corresponding pixel locations may also be calculated 134, and the text-color estimate validity may be determined 136. The three calculations 132-136 may be performed in any order. The distance between the text-color estimate and the image value at corresponding pixel locations may be compared to a text-color threshold, the distance between the background-color estimate and the image value at corresponding pixel locations may be compared to an addition threshold and the text-color estimate validity may be considered 138 in determining whether to add a pixel into the text map. If the distance between the text-color estimate and the image value at corresponding pixel locations is less than the text-color threshold and the distance between the background-color estimate and the image value at corresponding pixel locations is greater than the addition threshold and the text-color estimate is valid 139, then the pixel may be added to the text map 140. If the pixel is a text pixel 120 according to the text map 11, then the distance between the background-color estimate and the image value at corresponding pixel locations may be calculated 122, and the text-color estimate validity may be determined 124. The two calculations 122 and 124 may be performed in any order. The distance between the background-color estimate and the image value at corresponding pixel locations may be compared to a removal threshold and the text-color estimate validity may be considered 126 in determining whether to remove a pixel from the text map. If the distance between the background-color estimate and the image value at corresponding pixel locations is less than the removal threshold and the text-color estimate is valid 127, then the pixel may be removed from the text map 128. In alternative embodiments, a calculation block common to each branch of the embodiments shown in FIG. 11 may be moved ahead of the decision 110.

Figure 12:
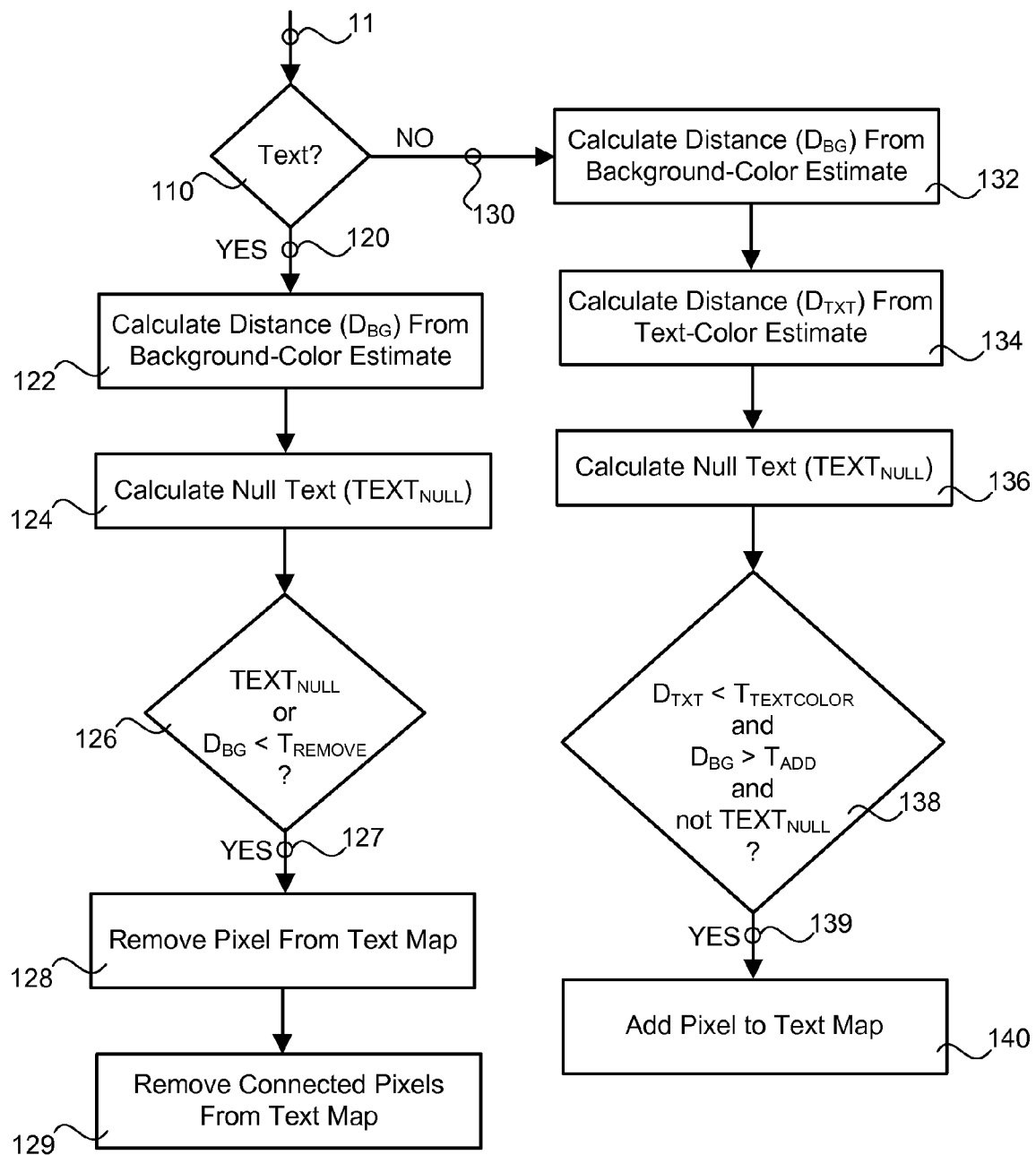
FIG. 12 is a drawing showing embodiments of the present invention comprising rejection decision propagation.

In some embodiments of the present invention, rejection of previously classified text pixels may be made more aggressive by using a connectivity-based procedure to spread the rejection signal to all text pixels connected to a pixel that is rejected based on the background color criteria. This rejection strategy may be beneficial in cases where a region of false positive text pixels is larger than can be eliminated using the background color criteria. Some embodiments may comprise a basic connectivity criterion (e.g., 4-way or 8-way connectedness). Alternative embodiments may extend a basic connectivity criterion by imposing an additional color constraint on the spread of the rejection signal. This condition may lessen the aggressiveness of the rejection by preventing the spread of the rejection signal to good text that is connected to a false-positive text pixel. An exemplary embodiment comprising a connectivity-based propagation of text pixel rejection may be described in relation to FIG. 12. After determining that a text pixel may be removed from the text map 128, all pixels connected to the pixel under examination according to a connectivity criterion may be removed from the text map 129.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for classifying a pixel in a digital image, said method comprising:
   receiving a first classification map, wherein said first classification map identifies candidate pixels belonging to a first class in a digital image;
   receiving a first pixel location in said first classification map, wherein said first pixel location in said first classification map corresponds to a first pixel location in said digital image;
   calculating a first color estimate corresponding to said first pixel location in said digital image, wherein said first color estimate is a summary of the colors of a plurality of pixels belonging to said first class located in a region proximate to said first pixel location in said digital image;
   determining a validity state associated with said first color estimate, wherein said validity state is determined to be a state associated with an invalid first color estimate when a second plurality of pixels associated with said region does not contain at least one pixel identified as belonging to said first class according to said first classification map;
   calculating a first color difference from said first color estimate and the color of the pixel in said digital image at said first pixel location in said digital image; and
   refining said first classification map at said first pixel location in said first classification map based on said first color difference and said validity state.

2. A method according to claim 1, wherein said refining comprises:
identifying said pixel at said first pixel location in said first classification map as belonging to said first class if said first color difference is less than a first threshold.

3. A method according to claim 1 further comprising:
calculating a second color estimate corresponding to said first pixel location in said digital image, wherein said second color estimate is a summary of the colors of a plurality of pixels not belonging to said first class located in a region proximate to said first pixel location in said digital image;
calculating a second color difference from said second color estimate and the color of the pixel in said digital image at said first pixel location in said digital image; and
refining said first classification map at said first pixel location in said first classification map based on said second color difference.

4. A method according to claim 3, wherein said refining comprises:
identifying said pixel at said first pixel location in said first classification map as not belonging to said first class if said second color difference is less than a second threshold.

5. A method according to claim 1, wherein said first class is text.

6. A method according to claim 1, wherein said first class is non-text.

7. A method according to claim 1, wherein said first classification map and said digital image are the same resolution.

8. A method according to claim 1, wherein said first classification map is a first resolution and said digital image is a second resolution.

9. A method according to claim 1, wherein said summary of the colors of said plurality of pixels belonging to said first class located in said region proximate to said first pixel location in said digital image comprises a calculation selected from the group consisting of an average of said colors, a trimmed-mean of said colors, a median of said colors and a weighted average of said colors.

10. A system for classifying a pixel in a digital image, said system comprising:
a classification map receiver, in a computing device, for receiving a first classification map, wherein said first classification map identifies candidate pixels belonging to a first class in a digital image;
a location receiver, in said computing device, for receiving a first pixel location in said first classification map, wherein said first pixel location in said first classification map corresponds to a first pixel location in said digital image;
a first color estimate calculator, in said computing device, for calculating a first color estimate corresponding to said first pixel location in said digital image, wherein said first color estimate is a summary of the colors of a plurality of pixels belonging to said first class located in a region proximate to said first pixel location in said digital image;
a validity determiner, in said computing device, for determining a validity state associated with said first color estimate, wherein said validity state is determined to be a state associated with an invalid first color estimate when a second plurality of pixels associated with said region does not contain at least one pixel identified as belonging to said first class according to said first classification map;
a first color difference calculator, in said computing device, for calculating a first color difference from said first color estimate and the color of the pixel in said digital image at said first pixel location in said digital image; and
a first map refiner, in said computing device, for refining said first classification map at said first pixel location in said first classification map based on said first color difference and said validity state.

11. A system according to claim 10, wherein said first map refiner comprises:
a first classifier for identifying said pixel at said first pixel location in said first classification map as belonging to said first class if said first color difference is less than a first threshold.

12. A system according to claim 10 further comprising:
a second color estimate calculator for calculating a second color estimate corresponding to said first pixel location in said digital image, wherein said second color estimate is a summary of the colors of a plurality of pixels not belonging to said first class located in a region proximate to said first pixel location in said digital image;
a second color difference calculator for calculating a second color difference from said second color estimate and the color of the pixel in said digital image at said first pixel location in said digital image; and
a second map refiner for refining said first classification map at said first pixel location in said first classification map based on said second color difference.

13. A system according to claim 12, wherein said second map refiner comprises:
a second classifier for identifying said pixel at said first pixel location in said first classification map as not belonging to said first class if said second color difference is less than a second threshold.

14. A system according to claim 10, wherein said first class is text.

15. A system according to claim 10, wherein said first class is non-text.

16. A system according to claim 10, wherein said first classification map and said digital image are the same resolution.

17. A system according to claim 10, wherein said first classification map is a first resolution and said digital image is a second resolution.

18. A system according to claim 10, wherein said summary of the colors of said plurality of pixels belonging to said first class located in said region proximate to said first pixel location in said digital image comprises a calculation selected from the group consisting of an average of said colors, a trimmed-mean of said colors, a median of said colors and a weighted average of said colors.

19. A method for classifying a pixel in a digital image, said method comprising:
receiving a text map, wherein said text map identifies candidate text pixels in a digital image;
receiving a first pixel location in said text map, wherein said first pixel location in said text map corresponds to a first pixel location in said digital image;
calculating a text-color estimate corresponding to said first pixel location in said digital image, wherein said text-color estimate is a summary of the colors of a plurality of pixels belonging to a text class, as indicated by said text map, located in a region proximate to said first pixel location in said digital image;
determining a validity state associated with said text-color estimate, wherein said validity state is determined to be a state associated with an invalid text-color estimate when a second plurality of pixels associated with said region does not contain at least one pixel identified as belonging to a text class, as indicated by said text map;

calculating a text-color difference from said text-color estimate and the color of the pixel in said digital image at said first pixel location in said digital image;

calculating a background-color estimate corresponding to said first pixel location in said digital image, wherein said background-color estimate is a summary of the colors of a plurality of pixels not belonging to said text class, as indicated by said text map, location in a region proximate to said first pixel location in said digital image;

calculating a background-color difference from said background-color estimate and the color of the pixel in said digital image at said first pixel location in said digital image;

refining said pixel at said first pixel location in said text map as a text pixel if said text-color difference is less than a first threshold and said pixel at said first pixel location in said text map is identified as non-text and said validity state associated with said text-color estimate is not said state associated with an invalid text-color estimate;

refining said pixel at said first pixel location in said text map a non-text pixel if said background-color difference is less than a second threshold and said pixel at said first pixel location in said text map is identified as text; and wherein said summary of the colors of said plurality of pixels, belonging to said text class, located in said region proximate to said first pixel location in said digital image comprises a calculation selected from the group consisting of a trimmed-mean of said colors of said plurality of pixels, belonging to said text class, located in said region proximate to said first pixel location in said digital image, a median of said colors of said plurality of pixels, belonging to said text class, located in said region proximate to said first pixel location in said digital image and a weighted average of said colors of said plurality of pixels, belonging to said text class, located in said region proximate to said first pixel location in said digital image.

20. A method according to claim 19, wherein said text map and said digital image are the same resolution.

21. A method according to claim 19, wherein said text map is a first resolution and said digital image is a second resolution.

22. A method according to claim 19 further comprising:

calculating a background-text color difference between said background-color estimate and said text-color estimate; and rejecting said text-color estimate when said background-text color difference is less than a third threshold.

* * * * *